US012264643B2

(12) United States Patent
Aye et al.

(10) Patent No.: US 12,264,643 B2
(45) Date of Patent: Apr. 1, 2025

(54) FUEL SUPPLY SYSTEM AND METHOD FOR CONTROLLING A FUEL PUMP OF A FUEL SUPPLY SYSTEM FOR AN INTERNAL COMBUSTION ENGINE

(71) Applicant: Hitachi Astemo, Ltd., Hitachinaka (JP)

(72) Inventors: Maung Maung Aye, Schwaig-Oberding (DE); Yoshihito Yasukawa, Hitachinaka (JP); Masayuki Saruwatari, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/710,327

(22) PCT Filed: Nov. 17, 2022

(86) PCT No.: PCT/JP2022/042665
§ 371 (c)(1),
(2) Date: May 15, 2024

(87) PCT Pub. No.: WO2023/090386
PCT Pub. Date: May 25, 2023

(65) Prior Publication Data

US 2025/0012245 A1 Jan. 9, 2025

(30) Foreign Application Priority Data

Nov. 22, 2021 (DE) ..................... 10 2021 213 120.4

(51) Int. Cl.
*F02M 37/00* (2006.01)
*F02M 37/08* (2006.01)

(52) U.S. Cl.
CPC ....... *F02M 37/08* (2013.01); *F02M 2037/085* (2013.01)

(58) Field of Classification Search
CPC ........ F02M 59/20; F02M 43/02; F02M 37/08; F02M 2037/08
See application file for complete search history.

(56) References Cited

U.S. PATENT DOCUMENTS 6,742,479 B2 6/2004 Yanagisawa
9,243,598 B2 * 1/2016 Pursifull .............. F02M 65/002
(Continued)

OTHER PUBLICATIONS

International Search Report and Written Opinion for PCT/JP2022/042665, dated Feb. 7, 2023, 6 pages.

*Primary Examiner* — Hung Q Nguyen
*Assistant Examiner* — Sherman D Manley
(74) *Attorney, Agent, or Firm* — Foley & Lardner LLP

(57) ABSTRACT

The subject matter described here relates to a method, a controller and computer program product for controlling a fuel pump of a fuel supply system for an internal combustion engine, and a fuel supply system for an internal combustion engine.
The problem to be solved is not being provided with an efficient fuel supply system capable of supplying various types of fuels without bubble formation under different environmental conditions.
The method comprises the steps of measuring a pressure of a fuel in the fuel supply system by a first measuring means; measuring a temperature of the fuel by a second measuring means; measuring a physical parameter of the fuel by a third measuring means; determining, by a control unit, a fuel type based on the measured physical parameter of the fuel, a vapor pressure of the fuel based on the determined fuel type and the measured temperature, and a pressure amplitude of the measured pressure; calculating, by the control unit, a first target pressure value as a sum of the determined vapor pressure, the determined pressure amplitude and a predetermined pressure margin, and a pressure difference between
(Continued)

the first target pressure value and a predetermined second target pressure value; and if the calculated pressure difference is greater than zero, adjusting, by the control unit, a control value for controlling an operating point of the fuel pump based on the calculated pressure difference.

11 Claims, 9 Drawing Sheets

(56) References Cited

U.S. PATENT DOCUMENTS

| | | | | |
|---|---|---|---|---|
| 9,303,605 | B2 * | 4/2016 | Marriott | F02D 19/0668 |
| 9,874,185 | B2 * | 1/2018 | Pursifull | F02D 41/3845 |
| 2011/0231082 | A1 * | 9/2011 | Saruwatari | F02D 41/0042 701/104 |
| 2014/0230794 | A1 * | 8/2014 | Surnilla | F02D 41/3854 123/495 |
| 2015/0114477 | A1 * | 4/2015 | Wood | B64D 37/22 137/12 |
| 2018/0135550 | A1 * | 5/2018 | Trzeciak | F02M 63/0054 |
| 2019/0226415 | A1 * | 7/2019 | Woodring | F02D 41/3094 |
| 2020/0172088 | A1 * | 6/2020 | Dudar | B60W 30/06 |
| 2022/0389876 | A1 * | 12/2022 | Castillo | F02C 9/40 |

* cited by examiner

FUEL SUPPLY SYSTEM AND METHOD FOR CONTROLLING A FUEL PUMP OF A FUEL SUPPLY SYSTEM FOR AN INTERNAL COMBUSTION ENGINE

TECHNICAL FIELD

The subject matter described herein relates to a method, a controller and computer program product for controlling a fuel pump of a fuel supply system for an internal combustion engine, and a fuel supply system for an internal combustion engine.

BACKGROUND ART

In order to slow down the global climate change, a massive reduction in $CO_2$ emissions in industry and transport is necessary. In addition to the increased use of electric drives, there is still a need for internal combustion engines in vehicles, in order to be able to cover longer distances.

To achieve the required $CO_2$ reduction, biofuels and so-called electric fuels for internal combustion engines play an important role. Biofuels such as ethanol have already demonstrated their importance as an alternative to gasoline. Currently, the production of second-generation ethanol, which can be obtained from cellulose, for example, is gaining importance. Electric fuels are synthetic fuels that are produced by reacting hydrogen from renewable energies with carbon dioxide. Examples for liquid electric fuels usable in gasoline engines are methanol and dimethyl carbonate (DMC). It is expected that these synthetic fuels will in future be provided at filling stations both in pure form and mixed with conventional fuels.

However, when handling different types of fuel in a fuel supply system of an internal combustion engine, the different fuel properties must be taken into account. In particular, the vapor pressure of the fuel used has to be considered, to avoid the formation of gas bubbles in the fuel supply system, which can block fuel injection and cause damage to fuel-carrying components. Gas bubbles that form in the fuel supply system (low-pressure side of the gasoline direct injection system) can be transported to the high-pressure side, where they are compressed and implode. If the gas bubbles implode on the surfaces of the injection components, this leads to cavitation erosion, which causes severe damage to the components.

Therefore, a fuel supply system is required ensuring that the fuel pressure in the system is always above vapor pressure, regardless of the fuel used.

CITATION LIST

Patent Literature

Patent Literature 1: U.S. Pat. No. 6,742,479 B2

SUMMARY OF INVENTION

Technical Problem

Patent Literature 1 describes a fuel supply system for a dimethyl ether engine, wherein dimethyl ether is supplied from a fuel tank to a high-pressure fuel pump while being raised to a saturated vapor pressure or above by means of a pressure feed pump. The fuel supply system comprises a dimethyl ether detecting device for detecting the state of the dimethyl ether from the pressure feed pump, and an electronic control unit for driving the high-pressure fuel pump when the dimethyl ether inside the fuel pipe leading to the high-pressure fuel pump is in a liquid state.

However, the fuel supply system disclosed in patent literature 1 is specifically designed to operate with dimethyl ether and, thus, not able to deal with different kinds of fuel.

An objective of the subject matter described herein is to provide an efficient fuel supply system capable of supplying various types of fuels without bubble formation under different environmental conditions. This problem is solved by the subject matter according to the independent claims. Further preferred developments are described by the dependent claims.

Solution to Problem

The herein described subject matter comprises a method for controlling a fuel pump of a fuel supply system for an internal combustion engine. The method comprises the steps of measuring a pressure of a fuel in the fuel supply system by a first measuring means, measuring a temperature of the fuel by a second measuring means and measuring a physical parameter of the fuel by a third measuring means.

Subsequently, a control unit determines a fuel type based on the measured physical parameter of the fuel and a vapor pressure of the fuel based on the determined fuel type and the measured temperature. Preferably, the physical parameter of the fuel measured/detected by the third measuring means may be a dielectric constant, a density and/or a kinematic viscosity of the fuel in the fuel supply system.

The following table 1 shows examples of physical parameters for various fuels. It becomes obvious that in particular the dielectric constant of the respective fuels differs significantly. Thus, a fuel type can be reliably detected by measuring the dielectric constant.

TABLE 1

| | Formula | Dielectric constant $\varepsilon_r$[—] | Density $\rho$ [g/cm$^3$] | Kin. Viscosity $\upsilon$ [mm$^2$/s] |
|---|---|---|---|---|
| Gasoline | | 1.95 | 0.75 | 0.53 |
| DMC | C3H6O3 | 3.07 | 1.08 | 0.63 |
| Ethanol | C2H6O | 22.34 | 0.8 | 1.52 |
| Methanol | CH3O | 29.37 | 0.8 | 0.69 |

To increase the accuracy of the detection, further physical parameters such as the density and the kinematic viscosity of the fuel in the fuel supply system may be measured in addition.

When the fuel type is identified, a vapor pressure of the fuel is determined based on the identified fuel type and the measured temperature. The vapor pressure is defined as the pressure exerted by a vapor in thermodynamic equilibrium with its condensed phases (solid or liquid) at a given temperature in a closed system. In case of a fuel in a fuel supply system, this means that the fuel will form gas bubbles if the fuel pressure drops below the vapor pressure. The vapor pressure is a function of the temperature (the higher the temperature, the higher the vapor pressure) and varies between different fuels. In particular, methanol and ethanol, which play an important role as alternative fuels, have a higher vapor pressure as gasoline. Thus, for dealing with different fuels in a fuel supply system, it is necessary to determine the vapor pressure of the fuel used, to avoid the formation of gas bubbles. By specifically determining the vapor pressure of the fuel used at the current fuel temperature, the fuel pressure in the fuel supply system can be precisely adjusted to the prevailing conditions.

Additionally, the control unit determines a pressure amplitude of the measured pressure. The average pressure in a fuel supply system is usually superimposed by a pressure fluctuation/pressure pulsation caused, for example, by an oscillating piston movement of the high-pressure pump. This pressure pulsation has to be considered to ensure, that the lowest pressure occurring in the fuel supply system does not fall below the vapor pressure. The pressure amplitude may be determined from the measured pressure signal by determining the average pressure and the lowest measured pressure in a predetermined time interval and then forming the difference between the average pressure and the lowest pressure. For example, the predetermined time interval may be in the range of 0.2 s to 2 s. This process can be repeated continuously during operation of the fuel supply system.

Furthermore, the control unit calculates a first target pressure value as a sum of the determined vapor pressure, the determined pressure amplitude and a predetermined pressure margin. The predetermined pressure margin may be a safety margin ensuring that the first target pressure is always above the vapor pressure. The predetermined pressure margin may vary depending on the temperature and/or the operating point of the fuel pump, to ensure that the fuel pump does not operate outside its optimized operating range. For example, the predetermined pressure margin may be in a range of 0.2 bar to 1 bar.

By calculating a first target pressure value as a sum of the determined vapor pressure, the determined pressure amplitude and a predetermined pressure margin, a currently valid target pressure is specified which ensures that the fuel pressure in the fuel supply system remains above the vapor pressure.

To provide a control value for controlling an operating point of the fuel pump, the control unit calculates a pressure difference between the first target pressure value and a predetermined second target pressure value. In case the calculated pressure difference is larger than zero, the control unit adjusts the control value for controlling an operating point of the fuel pump based on the calculated pressure difference. In other words, the control unit compares the determined first target pressure value with a pre-determined second target pressure value and adjusts the control value for controlling the operating point of the fuel pump so that the fuel is delivered at a higher pressure if the first target pressure value is larger than the predetermined second target pressure.

The method described above prevents fuel injection failure caused by a fuel vapor lock and minimizes cavitation erosion risk at the inlet valve of the high-pressure pump and along the high-pressure side of the injection system. Furthermore, the method enables efficient operation of the fuel pump by avoiding unnecessarily increase of the target pressure by measuring the fuel pressure and determining the associated vapor pressure.

According to an aspect, the predetermined second target pressure value is stored in the control unit as a function of a fuel temperature. The predetermined second target pressure may be understood as a basic target pressure value, which may be generally valid over the entire engine map, but may be adjusted in certain engine operating points and/or at certain environmental conditions.

For example, the second target pressure value may be stored in a characteristic curve as a function of the fuel temperature in such a way that a higher target pressure is output at higher fuel temperatures. Alternatively, the second target pressure value may be stored in a map as a function of fuel temperature and engine speed such that the target pressure is additionally increased at high engine speed to maintain the delivery rate of the high-pressure pump. It may also possible that a plurality of characteristic curves or maps, in which the second target pressure value is stored for different fuels, are provided in the control unit.

This means that the vapor pressure of the fuel used is already considered in the second target pressure value to a certain degree, so that the control value of the fuel pump is only adjusted in specific situations in which the first target pressure value determined from currently measured values exceeds the second target pressure value.

According to an aspect, the control value for controlling the operating point of the fuel pump may be adjusted by first converting the calculated pressure difference into a control value difference using a PID controller. In other words, a PID controller is used to convert the pressure difference into a value suitable to control the operation of the fuel pump. The use of a PID controller allows for amplifying the control value difference in response to a currently detected large pressure difference. The control value difference may then be added to the existing control value, which is preferably based on the predetermined second target pressure value. Preferably, the existing control value may be determined from a characteristic curve of the fuel pump which may be stored in the control unit or in a separate unit of the fuel pump. For example, if the fuel pump is a positive displacement pump driven by a DC motor, the characteristic curve may indicate the control voltage and/or the control current required to achieve a specific fuel flow rate at a specific fuel pressure. The fuel pump characteristic curve may also include one or more maps to provide a control value.

Alternatively, the control value for controlling the operating point of the fuel pump may be adjusted by calculating a third target pressure value being the sum of the calculated pressure difference and the predetermined second pressure value. The third target pressure value may then be converted into the control value using a characteristic curve of the fuel pump, in the same way as described above. In this case, the currently determined pressure difference between the first and second target pressure value may already be taken into account when generating the control value for controlling the operating point of the fuel pump.

According to an aspect, the fuel type is determined by the control unit based on the measured physical parameter of the fuel using a first set of reference data stored in the control unit as a function of a fuel temperature. This means that the first set of reference data includes characteristic curves or maps for a plurality of different fuels each including one or more physical parameters that can be used to identify the fuel type, as a function of fuel temperature. This is needed as the physical parameters vary at different fuel temperatures. For example, the dielectric constant, the density, and the viscosity decrease with increasing temperature. Therefore, it is necessary to store the physical parameters as a function of the fuel temperature, in order to correctly determine the fuel type under various environmental conditions. For determining a fuel composition including more than one type of fuel (more than one fuel component) it is referred to our Patent application DE 10 2020 216 593.9.

According to an aspect, the vapor pressure of the fuel is determined by the control unit using a second set of reference data stored in the control unit as a function of a fuel temperature and a fuel type. In other words, vapor pressure curves of the plurality of fuels may be stored in the control unit as a function of the fuel temperature. To determine the current vapor pressure of the detected fuel, the corresponding value can be taken from the respective curve at the currently measured temperature. The temperature range of the vapor pressure curves may be in the range of 0° C. to 150° C.

The herein described subject matter further comprises a fuel supply system for an internal combustion engine which includes a fuel pump for feeding a fuel in the fuel supply system from a tank to a high-pressure pump and a feed pipe for connecting the fuel pump and the high-pressure pump. Preferably the fuel pump may be roller cell pump driven by an electric motor. Most preferably the electric motor may be a DC motor controlled by a control voltage via duty factor.

The fuel supply system further comprises a first measuring means for measuring a pressure of the fuel in the fuel supply system, a second measuring means for measuring a temperature of the fuel in the fuel supply system and a third measuring means for measuring a physical parameter of the fuel in the fuel supply system.

The first measuring means may be a pressure sensor, preferably a piezoresistive pressure sensor. Any other type of pressure sensor suitable to measure a fuel pressure in the fuel supply system may be used as well. The second measuring means may be a temperature sensor, preferably a temperature sensor using a NTC sensor element. Any other type of temperature sensor suitable to measure a fuel temperature in the fuel supply system may be used as well.

The third measuring means may preferably be a tuning fork resonator. Alternatively or additionally, a capacitive sensor or any other type of sensor can be used that is suitable for detecting the physical parameters described above.

Additionally, the fuel supply system includes a control unit, which is electrically connected to the first, second and third sensing means. The control unit is configured to receive a fuel pressure measured by the first sensing means, a fuel temperature measured by the second sensing means and a physical parameter measured by the third sensing means. Furthermore, the control unit is configured to perform the method described above using the signals received from the measuring means. Preferably, the control unit may be the engine control unit or may be integrated into the engine control unit. Alternatively, the control unit may be a separate device located remotely from the engine control unit.

According to an aspect, the first, second and third measuring means may be arranged in the feed pipe for measuring a pressure, a temperature and a physical parameter of a fuel flowing in the feed pipe. This means that the measuring means may be installed between the fuel pump and the high-pressure pump at the low-pressure side of the gasoline direct injection system. Preferably the first and second measuring means may be arranged in the vicinity of the high-pressure pump, to determine the conditions of the fuel directly before it enters the high-pressure pump. In this way, gas bubble formation upstream of the high-pressure pump can be reliably prevented.

According to an aspect, a sampling rate of the first measuring means may be higher than a piston stroke frequency of the high-pressure pump. To accurately determine the pressure amplitude of the fuel in the fuel supply system, in particular the pressure amplitude of the fuel in the fuel type between the fuel pump and the high-pressure pump, it is necessary to detect the pressure at a sample rate that is higher than the frequency of the pressure pulsations occurring in the fuel pipe. Since the pressure pulsations in the fuel pipe between the fuel pump and the high-pressure pump are induced by the oscillating movement of the piston in the high-pressure pump, the sampling rate may be higher than the piston stroke frequency.

The herein described subject matter further comprises a controller for controlling an internal combustion engine and for performing the above-described method. Preferably, the controller may be the engine control unit or may be integrated into the engine control unit. Alternatively, the controller may be a separate device located remotely from the engine control unit.

Additionally, the herein described subject matter comprises a computer program product storable in a memory comprising instructions which, when carried out by a computer, causes the computer to perform the above-described method.

Advantageous Effects of Invention

Summarizing the above, the herein described subject matter prevents fuel injection failure caused by a fuel vapor lock and minimizes cavitation erosion risk at the inlet valve of the high-pressure pump and along the high-pressure side of the injection system. The method also enables efficient operation of the fuel pump by avoiding unnecessarily increase of the target pressure by measuring the fuel pressure and determining the associated vapor pressure.

BRIEF DESCRIPTION OF DRAWINGS

In the following, the subject matter will be further explained based on at least one preferential example with reference to the attached exemplary drawings, wherein.

DESCRIPTION OF EMBODIMENTS

Figure 1:
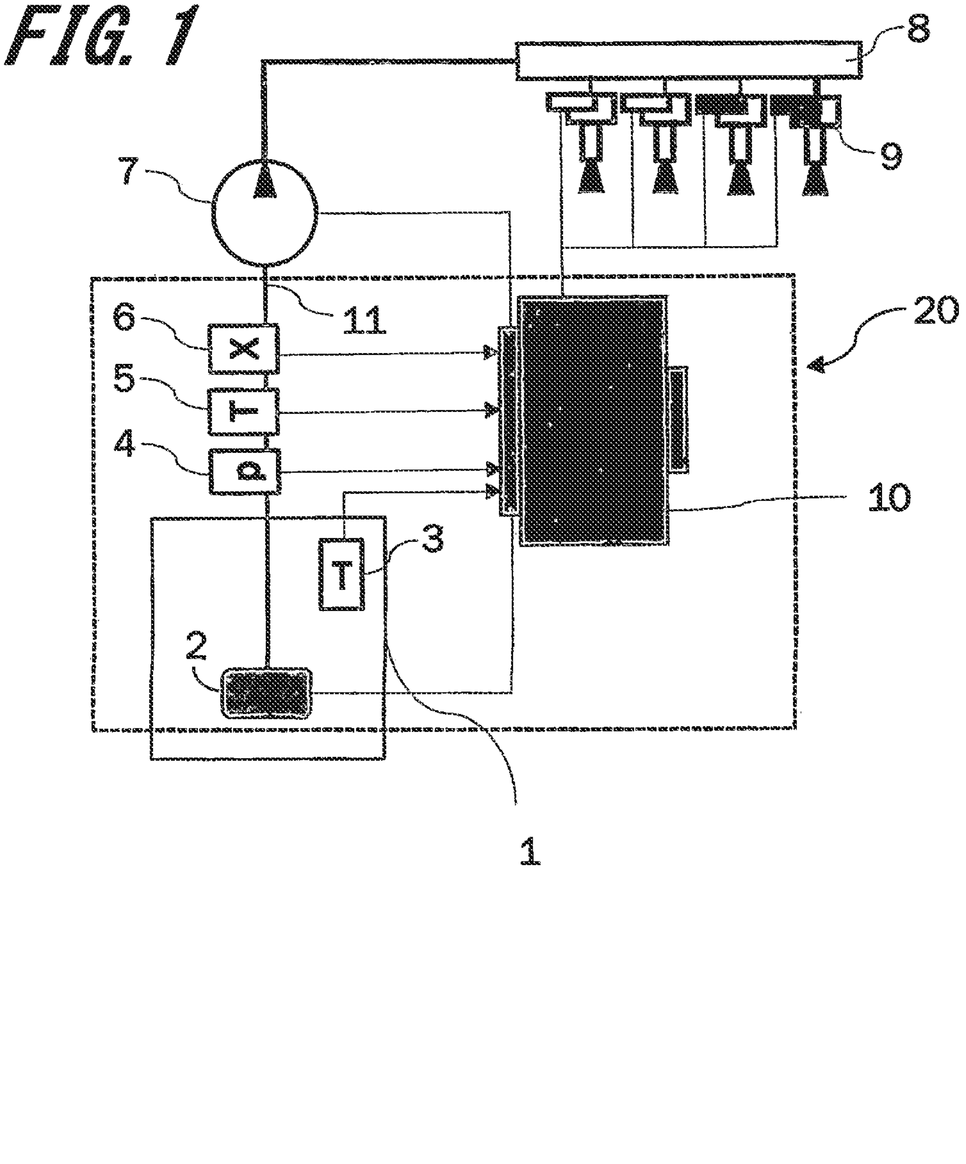
FIG. 1 schematically shows an example of a fuel supply system according to the herein described subject matter integrated in a gasoline direct injection system.

FIG. 1 schematically shows an example of a fuel supply system 20 according to the herein described subject matter, wherein the fuel supply system 20 integrated in a gasoline direct injection system. The fuel supply system comprises a fuel pump 2, which is installed in a fuel tank 1, and a feed pipe 11, which connects the fuel pump 2 to a high-pressure pump 7. It may also be possible that the fuel pump is installed outside the fuel tank 1.

The pressure range in which the fuel pump 2 delivers the fuel to the high-pressure pump 7 may be in the range from 1 bar to 25 bar. The pressure range to which the fuel is compressed by the high-pressure pump 7 may be in the range from 50 bar to 600 bar. Further, the fuel supply system 20 includes three measuring means 4, 5, 6 which are installed in the fuel pipe 11 between the fuel pump 2 and the high-pressure pump 7. The first measuring means 4 may measure the fuel pressure in the feed pipe 11, the second measuring means 5 may measure the fuel temperature in the feed pipe 11 and the third measuring means 6 may detect a physical parameter representing a type of the fuel flowing through the feed pipe 11. The first measuring means 4 may be a pressure sensor, preferably a piezoresistive pressure sensor. The second measuring means 5 may be a temperature sensor, preferably a temperature sensor using a NTC sensor element. Any other type of pressure and/or temperature sensor suitable to detect the fuel pressure/fuel temperature in the feed pipe 11 may be used as well. The third measuring means 6 may preferably be a tuning fork resonator. Alternatively or additionally, a capacitive sensor or any other type of sensor can be used that is suitable for detecting a physical parameter representing a fuel type.

In addition, the fuel supply system 20 comprises a control unit 10 which is electrically connected to the measuring means 4, 5, 6 and receives measured values from them for determining the vapor pressure and the pressure pulsations. The control unit 20 is further electrically connected to the fuel pump 2, the high-pressure pump 7 and the fuel injectors 9 to perform control of these components. The depicted fuel supply system 20 has an additional temperature sensor 3, which is arranged in the fuel tank 1 and is also electrically connected to the control unit 10. The additional temperature sensor 3 may be of the same type as the second measuring means 5. It may also be possible that another type of sensor capable of measuring a fuel temperature in a tank is used. The additional temperature sensor 3 makes it possible to detect a change in temperature in the tank (below the operating temperature) during refueling or during prolonged engine standstill in hybrid vehicles.

The fuel supply system 20 is connected to a high-pressure pump 7, which in turn is connected to a fuel rail 8 from which fuel is distributed to four high-pressure fuel injectors 9, each injecting fuel into a combustion chamber of an internal combustion engine (not depicted). The four high-pressure fuel injectors 9 depicted in FIG. 1 only serve as an example for any number of fuel injectors that may be connected to the fuel rail.

The fuel supply system 20 according to the herein described subject matter is also suitable for a low-pressure injection system. In this case the high-pressure pump 7 is missing and the fuel pump 2 delivers the fuel directly to the fuel rail 8 from which it is distributed to low-pressure fuel injections 9.

Figure 2:
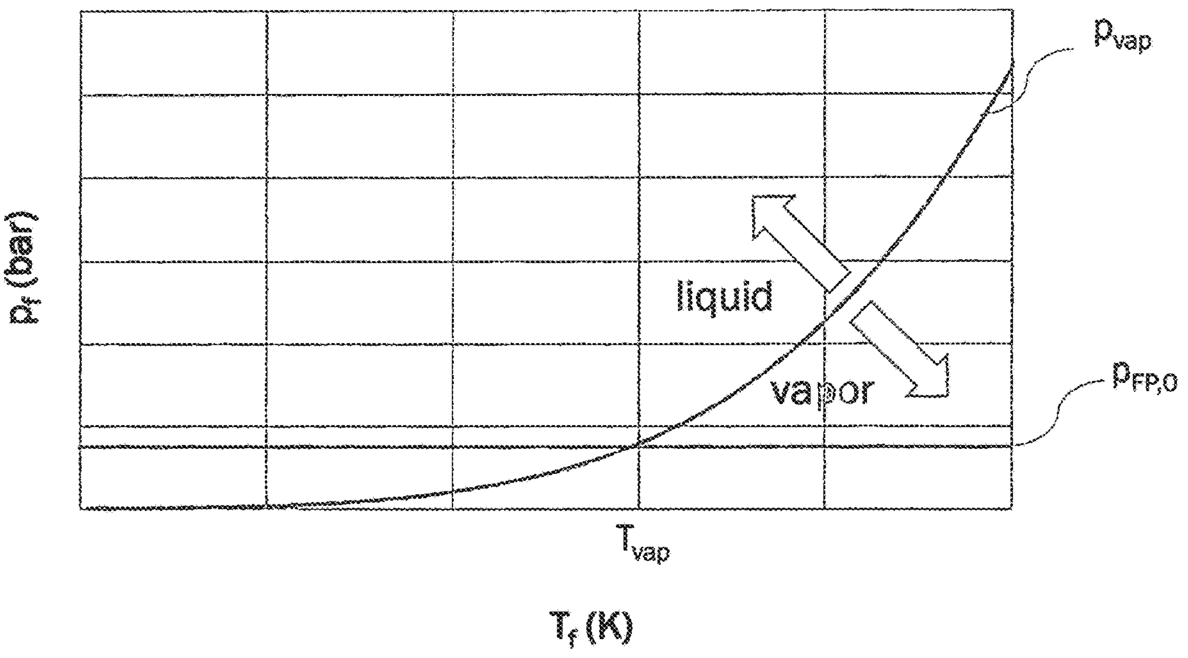
FIG. 2 shows a diagram depicting schematically an example of a vapor pressure curve as a function of temperature for an arbitrary fuel.

A high-pressure fuel injector may be a fuel injector designed for injecting fuel in a range from 50 bar to 600 bar, and a low-pressure fuel injector may be a fuel injector designed for injecting fuel in a range from 1 bar to 25 bar FIG. 2 shows a diagram depicting an example of a vapor pressure curve $p_{vap}$ as a function of temperature $T_f$ for an arbitrary fuel. The pressure and temperature region above the vapor pressure curve $p_{vap}$, in which the fuel is present in liquid form, is marked by a gray bold arrow, and the pressure and temperature region below the vapor pressure curve $p_{vap}$, in which the fuel is present in vapor form, is marked by a white bold arrow. Additionally, a constant fuel pressure value $p_{FP,0}$ is depicted, which represents a typical fuel pressure value in a fuel supply system 20 before the high-pressure pump 7. It can be seen from FIG. 2 that above a temperature $T_{vap}$ the fuel pressure value $p_{FP,0}$ is lower than the vapor pressure of the fuel so that gas bubbles may occur in the fuel supply system 20.

Figure 3:
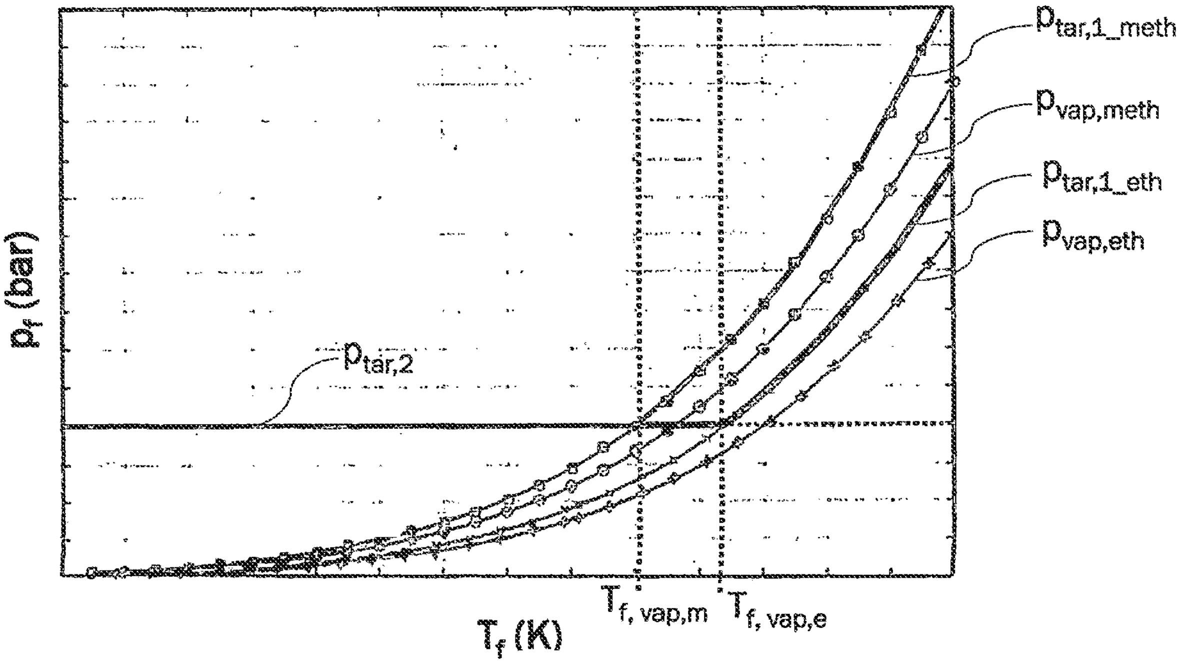
FIG. 3 shows a diagram depicting schematically the vapor pressure curves of methanol and ethanol as a function of temperature and the increased fuel pressure provided by the fuel supply system according to the subject matter described herein.

FIG. 3 shows a diagram depicting examples of vapor pressure curves of methanol $p_{vap,meth}$ and ethanol $p_{vap,eth}$ determined by the control unit 10 as a function of fuel temperature Tr. Furthermore, the predetermined second target pressure value $p_{tar,2}$ and the first target pressure values for methanol $p_{tar,1\_meth}$ and ethanol $p_{tar,1\_eth}$ calculated by the control unit 10 are depicted.

One can recognize that below the fuel temperature $T_{f,vap,m}$ and $T_{f,vap,e}$, respectively, the predetermined second target pressure $p_{tar,2}$ is higher than the first target pressure values $p_{tar,1\_meth}$ and $p_{tar,1\_eth}$ calculated as a sum of the determined vapor pressure, the determined pressure amplitude and a predetermined pressure margin. Therefore, up to the temperature $T_{f,vap,m}$ and $T_{f,vap,e}$, respectively, it is not necessary to adjust the control value for controlling the operating point of the fuel pump 2, in order to increase the fuel pressure pf.

However, if the fuel temperature $T_f$ exceeds the temperatures $T_{f,vap,m}$ and $T_{f,vap,e}$, respectively, the first target pressure values $p_{tar,1\_meth}$ and $p_{tar,1\_eth}$ exceed the value of the predetermined second target pressure $p_{tar,2}$, so that the control value of the fuel pump 2 is adjusted, and the fuel pressure $p_f$ in the feed pipe 11 is increased to the first target pressure value $p_{tar,1\_meth}$ and $p_{tar,1\_eth}$, respectively.

Figure 4:
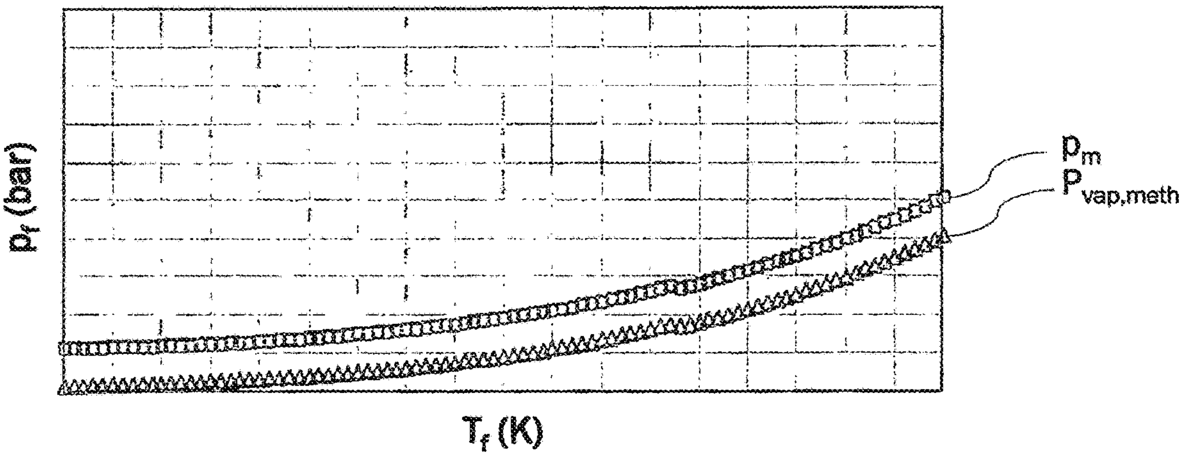
FIG. 4 shows a diagram depicting schematically an example for a predetermined pressure margin as a function of temperature.

FIG. 4 shows a diagram depicting an example of a vapor pressure curve of methanol $p_{vap,meth}$ determined by the control unit 10. Additionally, an example of a predetermined pressure margin $p_m$ is depicted as a function of fuel temperature $T_f$, which in the present case represents a constant offset on the determined vapor pressure curve $p_{vap,meth}$. However, it may be also possible that the predetermined pressure margin $p_m$ varies depending on the fuel temperature $T_f$ and/or the operation point of the fuel pump 2. The predetermined pressure margin $p_m$ may be an offset, as depicted in FIG. 4, or a relative value. The predetermined pressure margin $p_m$ may be in a range of 0.2 bar to 1 bar.

Figure 5:
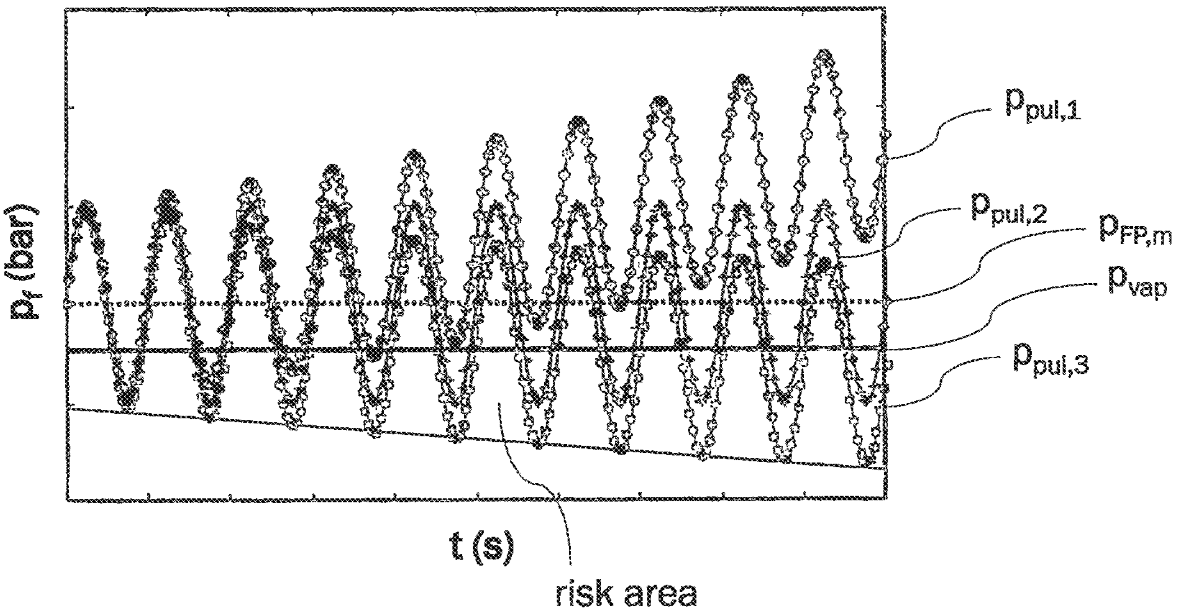
FIG. 5 shows a diagram depicting schematically different types of pressure pulsations occurring in a fuel pipe before a high-pressure pump.

FIG. 5 shows a diagram depicting different kinds of pressure pulsations $p_{pul,1}$, $p_{pul,2}$ and $p_{pul,3}$, which may occur in the feed pipe 11 to the high-pressure pump 7, as a function of time t at a constant fuel temperature $T_f$. Additionally the average fuel pressure $p_{FP,m}$ in the feed pipe 11, the vapor pressure of the fuel $p_{vap}$ and a risk area, in which gas bubble formation is to be expected, are illustrated.

The pressure pulsation $p_{pul,1}$ shows an exponential growth of the pressure pulsation, which means that the fuel pressure $p_f$ increases with time. In this case, there is less risk that the lowest pressure occurring in the pressure pulsation $p_{pul,1}$ will fall below the vapor pressure pap. However, the temporally constant pressure pulsation $p_{pul,2}$ is shown to drop below the vapor pressure $p_{vap}$, so that the undershoot of this pulsation $p_{pul,2}$ reaches the risk area in which formation of gas bubbles is to be expected. This means that in this case the average fuel pressure $p_{FP,m}$ has to be increased, to avoid the formation of gas bubbles in the fuel. The situation is aggravated if a pulsation such as the pressure pulsation $p_{pul,3}$ showing an exponential decrease in pressure, occurs in the feed pipe 11. In this case the pressure in the feed pipe 11 decreases with time, so that even a part of the pulsation overshoots reaches the risk area. Thus, the average fuel pressure $p_{FP,m}$ has to be increased even more, to avoid the formation of gas bubbles in the fuel.

It can be seen from FIG. 5 that monitoring the pressure pulsation in the fuel supply system is beneficial to avoid gas bubbles in the system, as different types of pressure pulsation can occur depending on the fuel flow rate in the fuel supply system.

Figure 6:
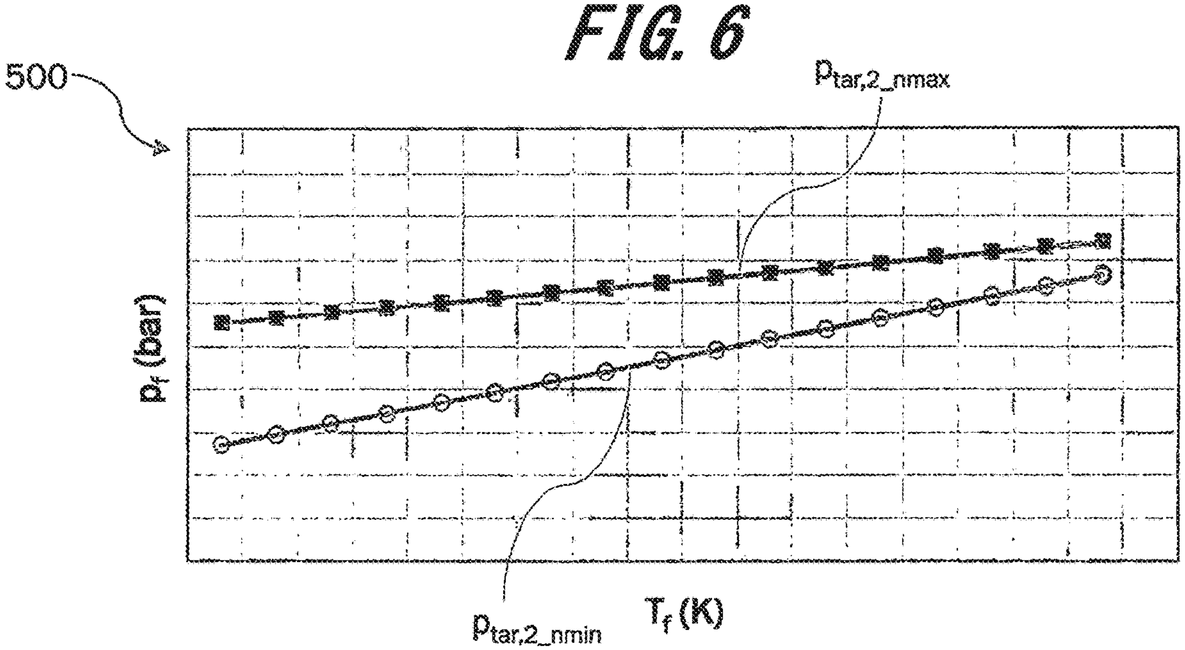
FIG. 6 shows a diagram depicting schematically two characteristic curves of a second target pressure value as a function of temperature.

FIG. 6 schematically shows a diagram 500 in which two characteristic curves of a second target pressure value as a function of temperature are depicted. The upper curve $P_{tar,2\_nmax}$ illustrates the second target pressure value at maximum engine speed and the lower curve $P_{tar,2\_nmin}$ illustrates the second target pressure value at minimum engine speed. The diagram 500 represents a map in which the second target pressure value $p_{tar,2}$ may be stored as a function of temperature and engine speed, i.e. further characteristic curves representing the engine speed range between maximum and minimum engine speed can be stored in the map. There may be different maps for different fuels or a single map comprising the second set pressure value $p_{tar,2}$ for a plurality of fuels.

It can be seen that at maximum engine speed a higher fuel pressure $p_{tar,2\_nmax}$ is needed than at minimum engine speed $P_{tar,2\_nmin}$, to maintain the required fuel flow rate of the high-pressure pump. Furthermore, the second target pressure value increases with higher temperature in both cases to prevent the formation of gas bubbles. This means that the vapor pressure of the fuel used is considered in the second target pressure value $p_{tar,2}$ to a certain degree, so that the control value of the fuel pump is preferably only adjusted in specific situations in which the first target pressure value determined from currently measured values exceeds the second target pressure value. In an alternative, it may also be possible for the second target pressure $P_{tar,2}$ to be determined without taking into account the vapor pressure of the fuel, since a suitable setting of the control value of the fuel pump based solely on the calculation of the first set pressure $p_{tar,1}$ is also possible.

An example for a possible relationship between the first and second target pressure is illustrated in the following FIG. 7, and FIG. 7 allows to understand different scenarios in which different pressure target values are selected by the control as, e.g., shown in FIG. 8.

Figure 7:
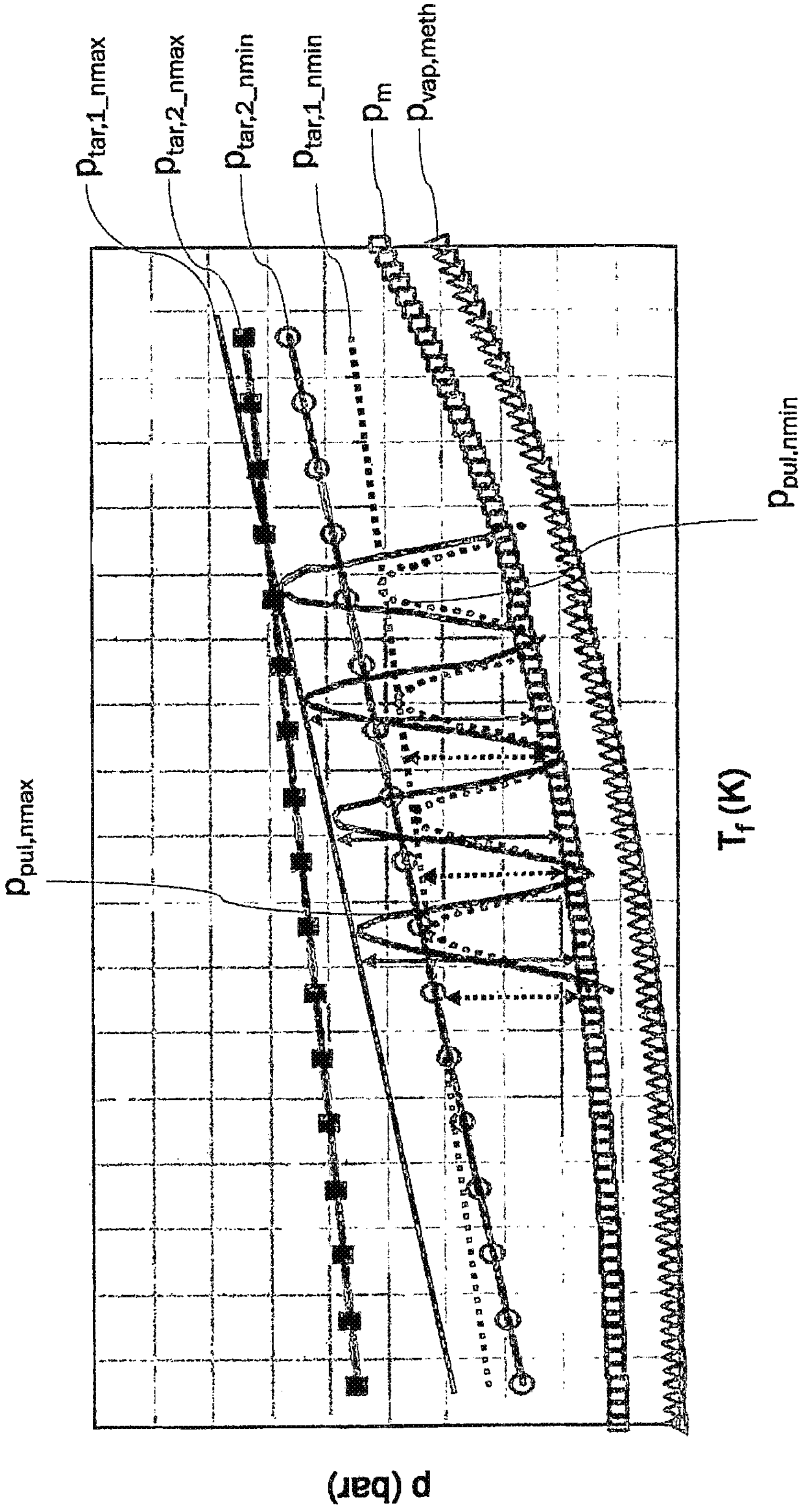
FIG. 7 shows a diagram illustrating the relationship between the first and second target pressure.

Specifically, FIG. 7 schematically shows two linear curves $P_{tar,1\_nmax}$, $P_{tar,1\_nmin}$ as a function of temperature representing the first target pressure value at maximum and minimum engine speed and being a sum of the determined vapor pressure $p_{vap,meth}$ of methanol, the pressure margin $p_m$ and the determined pressure pulsation $P_{pul,nmax}$, $P_{pul,nmin}$ at the respective engine speed. Furthermore, the two characteristic curves of the second target pressure value $P_{tar,2\_nmax}$, $P_{tar,2\_nmin}$ at maximum and minimum engine speed, which are known from FIG. 6, are depicted.

It can be seen that the amplitude of the pressure pulsation $P_{pul,nmin}$ at minimum engine speed (marked by dotted arrows) is lower than the amplitude of the pressure pulsation $P_{pul,nmax}$ at maximum engine speed (marked by the solid arrows). The reason for the different pressure amplitudes is the lower fuel flow rate required at lower engine speed. However, due to the pressure pulsation $P_{pul,nmin}$, the first target pressure becomes higher than the second target pressure at low fuel temperatures. This is due to the fact that at low speeds and temperatures, only a low pressure is required to provide the fuel flow rate of the high-pressure pump, so that a low second target pressure value $P_{tar,2\_nmin}$ is selected in this operating range of the engine. Since the first target pressure $P_{tar,1\_nmin}$ in this range is higher than the second target pressure $p_{tar,2\_nmin}$, the control unit may increase the control value of the fuel pump to compensate for the influence of the pressure pulsation $P_{pul,nmin}$.

At maximum engine speed, however, the second target pressure $P_{tar,2\_nmax}$ is higher than the first target pressure $p_{tar,1\_nmax}$ at low to medium fuel temperatures, so that no adjustment of the control value of the fuel pump is required in this operating points. One can recognize that the first target pressure value $p_{tar,1\_nmax}$ only exceeds the corresponding second target pressure value $P_{tar,2\_nmax}$ at high temperatures, so that an adjustment of the control value of the fuel pump at maximum engine speed is only required at high temperatures.

Figure 8:
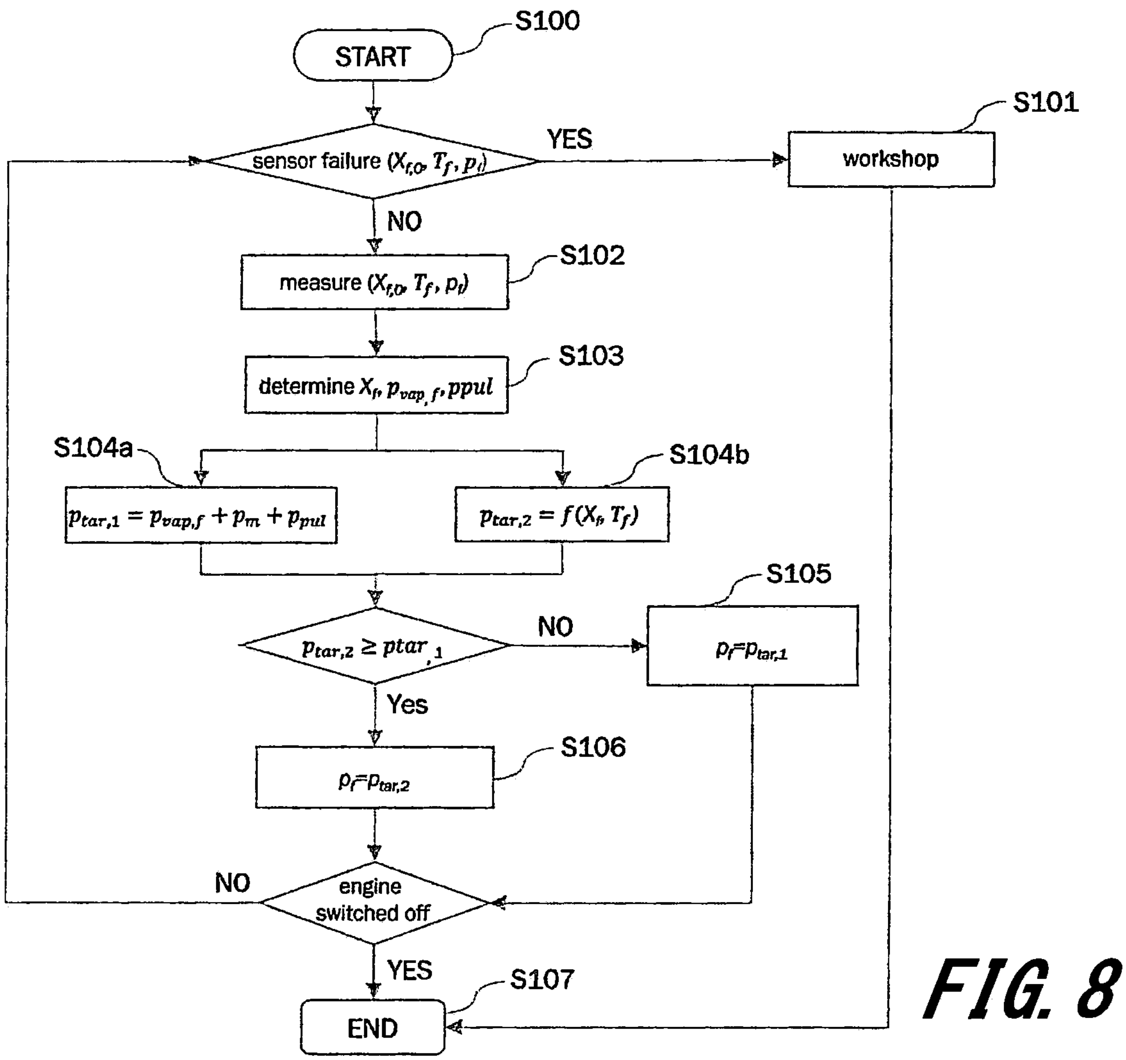
FIG. 8 depicts a flowchart showing individual steps of the method described herein by means of example.

FIG. 8 depicts a flowchart which shows individual steps of the herein described method by means of an example. The method starts at step S100 by checking if any of the sensors measuring the physical parameter $X_{f,0}$ representing the fuel type $X_f$, the temperature $T_f$ or the fuel pressure $p_f$ shows a failure. If this is the case, the fuel supply system has to be checked in a workshop (S101) and the method ends at step S107. If all sensors are ready for operation, a physical parameter $X_{f,0}$, a temperature $T_f$ and a pressure of the fuel $p_f$ are measured in step S102. Based on the measured sensor signals a fuel type $X_f$, a vapor pressure $p_{var,f}$ and an amplitude of the pressure pulsation $p_{pul}$ are determined in step S103.

The fuel type X, may for example determined by measuring a dielectric constant, a density and/or a kinematic viscosity of the fuel in the fuel supply system 20 and detecting the fuel type $X_f$ based on a first set of reference data stored in the control unit (20). This first set of reference data may include characteristic curves or maps for a plurality of different fuels each including one or more physical parameters $X_{f,0}$ that can be used to identify the fuel type $X_f$, as a function of fuel temperature $T_f$. The vapor pressure $p_{vap}$.f of the detected fuel may then be determined using vapor pressure curves stored in a second set of reference data for a plurality of fuels. To determine the current vapor pressure $p_{vap,f}$ of the detected fuel, the corresponding value can be taken from the respective vapor pressure curve at the currently measured temperature $T_f$. The pressure amplitude $p_{pul}$ may be determined from the measured pressure signal by determining the average pressure and the lowest measured pressure in a predetermined time interval and then forming the difference between the average pressure and the lowest pressure. Subsequently, in step S104*a* the first target pressure value $p_{tar,1}$ is calculated as a sum of the determined vapor pressure $p_{var,f}$, a predetermined pressure margin $p_m$ and the amplitude of the pressure pulsation $p_{pul}$. The predetermined pressure margin $p_m$ may be a safety margin ensuring that the first target pressure $p_{tar}$, is always above the vapor pressure $p_{var,f}$. The predetermined pressure margin $p_m$ may vary depending on the temperature and/or the operating point of the fuel pump 2, to ensure that the fuel pump 2 does not operate outside its optimized operating range.

In parallel, the predetermined second target pressure $p_{tar,2}$ is determined from a map, or a characteristic curve stored in the control unit 10 based on the engine speed (explained above for two different cases "min" and "max", however, more engine speeds may be considered as described in connection with FIG. 6), the determined fuel type X, and the determined temperature $T_f$ (S104*b*). Then a pressure difference between the first target pressure value $p_{tar,1}$ and the predetermined second target pressure value $p_{tar,2}$ is calculated. In other words, the first target pressure value $p_{tar,1}$ is compared to the second target pressure value $p_{tar,2}$. If the second target pressure $P_{tar,2}$ is lower than the first target pressure $p_{tar,1}$, a control value of the feed pump FP, (e.g., FIG. 9) is adjusted so that the first target pressure value $p_{tar,1}$ will be the control target to be reached (S105). This means that, if the second target pressure $p_{tar,2}$ is lower than the first target pressure $p_{tar,1}$, the control value of the feed pump $FP_s$ is adapted such that the fuel pressure $p_f$ becomes equal to the first target pressure value $p_{tar,1}$.

In the opposite case, the existing control value $FP_s$ of the feed pump is maintained, which means that the fuel pressure $p_f$ is controlled so that it becomes/is equal to the second target pressure $P_{tar,2}$ (S106). The described procedure is repeated as long as the engine is in operation and ends when the engine is switched off (S107).

Figure 9:
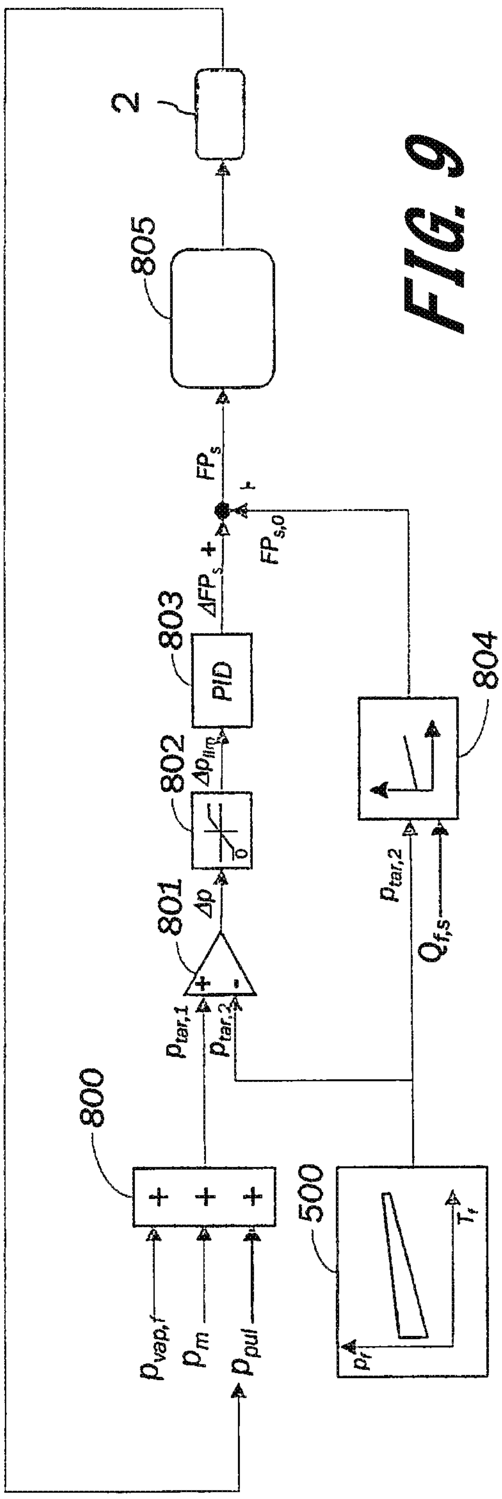
FIG. 9 depicts a block diagram showing exemplary functional blocks for performing steps of the method described herein.

FIG. 9 depicts a block diagram showing exemplary functional blocks for performing steps of the method described herein. In the functional block 800 the determined vapor pressure $p_{vap,f}$, the predetermined pressure margin $p_m$ and the determined amplitude of the pressure pulsation $p_{pul}$ are added, so that the first target pressure value $p_{tar,1}$ is calculated.

The functional block 500 represents the schematic map already known from FIG. 5, from which the second target pressure value $p_{tar,2}$ can be read. In functional block 801, the difference between the first and the second target pressure ?p is calculated, which is limited to values larger than or equal to zero by the subsequent limiter 802 with a lower limit value zero. The limiter 802 ensures that the control value FP, is only adjusted if the calculated pressure difference ?p is larger than zero, which means that the first target value $p_{tar,1}$ is larger than the second target pressure value $p_{tar,2}$. The limited pressure difference $?p_{lim}$ is input to a PID controller, which converts the pressure difference $?p_{lim}$ to a control value difference $?FP_s$. The use of a PID controller allows for amplifying the control value difference in response to a currently detected large pressure difference $?p_{lim}$. The control value difference $?FP_s$ is then be added to the existing control value $FP_{s,0}$ and input to the fuel pump controller 805 as an adjusted control value $FP_s$. The existing control value $FP_{s,0}$ is based on the second target pressure value, which is input into the functional block 804 including the characteristic curve of the fuel pump 2 as a function of fuel pressure and fuel volumetric flow rate $Q_{f,s}$. This means that the second target pressure $p_{tar,1}$ as well as the pressure difference are converted into control values $FP_{s,0}$ and $?FP_s$ suitable to control the operation of the fuel pump.

Further, FIG. 9 shows that the output of the fuel pump controller 805 is input into the fuel pump 2 as the updated pressure control value. Since adjusting the control value $FP_s$ can lead to a change in the output value of the fuel pump controller 805, which in turn can result in a change in pressure pulsation $p_{pul}$,an actual pressure value of the fuel pump 2 is fed back into the function block 800 such that the input value of the pressure pulsation $p_{pul}$ is continuously updated.

Alternatively, the control value $FP_s$ input into the fuel pump controller 805 may be adjusted by calculating a third target pressure value being the sum of the limited pressure difference $?p_{lim}$ and the predetermined second pressure value $P_{tar,2}$. The third target pressure value may then input into the functional block 804 to be converted into the control value $FP_{s,0}$ (which in this case is equal to the control value $FP_s$) using the characteristic curve of the fuel pump 2, in the same way as described above. In this case no PID controller may be used to amplify the limited pressure difference $?p_{lim}$, instead this pressure difference $?p_{lim}$ may already be taken into account before generating the control value $FP_s$ By performing the described method according to the flow chart of FIG. 7 and the block diagram of FIG. 8, the formation of gas bubbles in the fuel supply system 10 can be prevented by ensuring that the lowest fuel pressure in the fuel supply system 10 is always greater than the vapor pressure.

Again summarizing, the herein described subject matter prevents fuel injection failure caused by a fuel vapor lock and minimizes cavitation erosion risk at the inlet valve of the high-pressure pump and along the high-pressure side of the injection system. The method also enables efficient operation of the fuel pump by avoiding unnecessarily increase of the target pressure by measuring the fuel pressure and determining the associated vapor pressure.

As will be appreciated by one of skill in the art, the present disclosure, as described hereinabove and the accompanying figures, may be embodied as a method, an apparatus (including a device, machine, system, computer program product, and/or any other apparatus), or a combination of the foregoing.

Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system". Furthermore, embodiments of the present disclosure may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally may indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Aspects are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment.

It should be noted that terms such as "server" and "processor" may be used herein to describe devices that may be used in certain embodiments and should not be construed to limit to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present disclosure should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects and should not be construed to limit the disclosure to any particular logic flow or logic implementation. The described logic may be partitioned into different logic blocks (e.g., programs, modules, functions, or subroutines) without changing the overall results.

Often times, logic elements may be added, modified, omitted, performed in a different order, or implemented using different logic constructs (e.g., logic gates, looping primitives, conditional logic, and other logic constructs) without changing the overall results.

The present disclosure may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" may refer generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some aspects may be implemented as a combination of both software (e.g., a computer program product) and hardware. Still other embodiments of the may be implemented as entirely hardware, or entirely software.

While certain exemplary aspects have been described and shown in the accompanying drawings, it is to be understood that such aspects are illustrative, and that the embodiments are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured. Therefore, it is to be understood that, within the scope of the appended claims, the disclosure may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments or aspects described herein may be combined to form other embodiments.

REFERENCE SIGN LIST

1 fuel tank
2 fuel pump
3 temperature sensor (fuel tank)
4 first measuring means, pressure sensor
5 second measuring means, temperature sensor (fuel pipe)
6 third measuring means, fuel sensor
7 high pressure pump
8 fuel rail
9 fuel injectors
10 control unit
11 feed pipe

The invention claimed is:

1. A method for controlling a fuel pump of a fuel supply system for an internal combustion engine comprising the steps of measuring a pressure of a fuel in the fuel supply system by a first measuring means;

measuring a temperature of the fuel by a second measuring means;

measuring a physical parameter of the fuel by a third measuring means;

determining, by a control unit, a fuel type based on the measured physical parameter of the fuel, a vapor pressure of the fuel based on the determined fuel type and the measured temperature, and a pressure amplitude of the measured pressure;

calculating, by the control unit, a first target pressure value as a sum of the determined vapor pressure, the determined pressure amplitude and a predetermined pressure margin, and a pressure difference between the first target pressure value and a predetermined second target pressure value; and if the calculated pressure difference is larger than zero, adjusting, by the control unit, a control value for controlling an operating point of the fuel pump based on the calculated pressure difference.

2. The method according to claim 1, wherein the predetermined second target pressure value is stored in the control unit as a function of a fuel temperature.

3. The method according to claim 1, wherein the control value for controlling the operating point of the fuel pump is adjusted by performing the following steps:

converting the calculated pressure difference into a control value difference using a PID controller; and adding the control value difference to the control value, wherein the control value is based on the predetermined second target pressure value.

4. The method according to claim 1, wherein the control value for controlling the operating point of the fuel pump is adjusted by performing the following steps:

calculating a third target pressure value by adding the calculated pressure difference to the predetermined second pressure value;

converting the third target pressure value into the control value using a characteristic curve of the fuel pump.

5. The method according to claim 1, wherein the fuel type is determined by the control unit based on the measured physical parameter of the fuel using a first set of reference data stored in the control unit as a function of a fuel temperature.

6. The method according to claim 1, wherein the vapor pressure of the fuel is determined by the control unit using a second set of reference data stored in the control unit as a function of a fuel type and a fuel temperature.

7. A fuel supply system for an internal combustion engine comprising a fuel pump for feeding a fuel in the fuel supply system from a tank to a high-pressure pump;

a feed pipe for connecting the fuel pump and the high-pressure pump; a first measuring means for measuring a pressure of the fuel in the fuel supply system;

a second measuring means for measuring a temperature of the fuel in the fuel supply system;

a third measuring means for measuring a physical parameter of the fuel in the fuel supply system, a control unit electrically connected to the first, second and third sensing means, wherein the control unit is configured to receive a fuel pressure measured by the first measuring means, a fuel temperature measured by the second measuring means and a physical parameter measured by the third measuring means; and perform the method according to claim 1.

8. The fuel supply system according to claim 7, wherein the first, second and third measuring means are arranged in the feed pipe for measuring a pressure, a temperature and a physical parameter of a fuel flowing in the feed pipe.

9. The fuel supply system according to claim 7, wherein a sampling rate of the first measuring means is higher than a piston stroke frequency of the high-pressure pump.

10. A controller configured to control an internal combustion engine and to perform the method according to the method claim 1.

11. A computer program product storable in a memory comprising instructions which, when carried out by a computer, cause the computer to perform the method according to the method claim 1.

* * * * *